Figure 1:
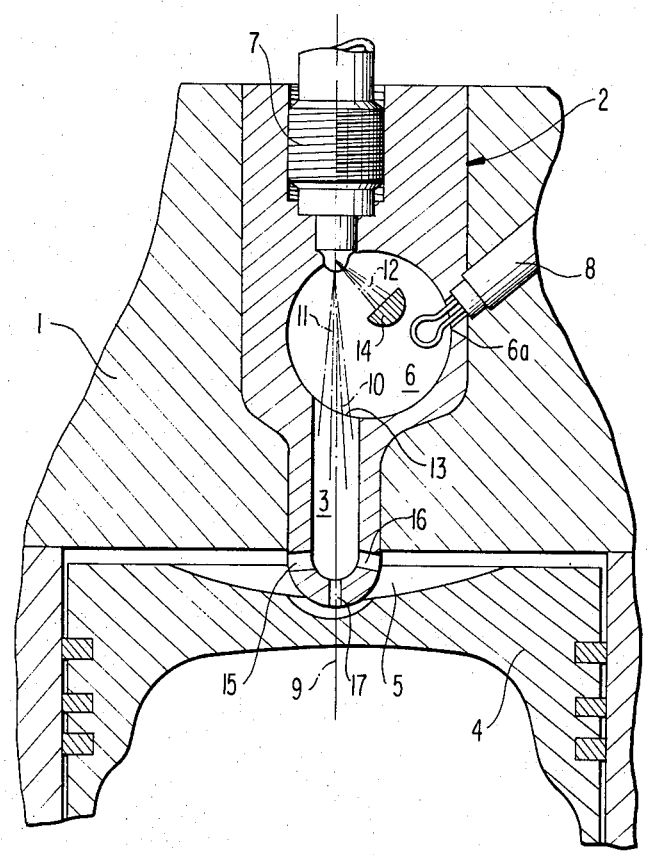

United States Patent [19]

Binder et al.

[11] 4,224,902
[45] Sep. 30, 1980

[54] AIR-COMPRESSING INJECTION INTERNAL COMBUSTION ENGINE WITH AUXILIARY CHAMBER

[75] Inventors: Klaus Binder, Deizisau; Peter Charzinski, Winnenden-Schelmenholz; Hermann Hiereth, Esslingen; Harald Polz, Plattenhardt, all of Fed. Rep. of Germany

[73] Assignee: Daimler-Benz Aktiengesellschaft, Fed. Rep. of Germany

[21] Appl. No.: 799,515

[22] Filed: May 23, 1977

[30] Foreign Application Priority Data

May 29, 1976 [DE] Fed. Rep. of Germany ....... 2624189

[51] Int. Cl.³ ............................................. F02B 3/00
[52] U.S. Cl. .................................. 123/280; 123/260; 123/293
[58] Field of Search ............ 123/32 C, 32 SA, 32 SP, 123/32 F, 32 G

[56] References Cited
U.S. PATENT DOCUMENTS 2,315,907  4/1943  Starr .

Primary Examiner—Ronald B. Cox
Attorney, Agent, or Firm—Craig & Antonelli

[57] ABSTRACT

An air-compressing injection internal combustion engine with a main combustion space arranged in the piston and with an auxiliary chamber equipped with an injection nozzle and with a glow plug, which is in continuous communication with the main combustion space by way of a channel-shaped constriction. The pressure chamber of the auxiliary chamber is thereby disposed eccentrically in relation to the injection nozzle and the constriction while the injection nozzle injects with a first jet into the constriction and with a second jet in the direction or into the area near the glow plug which is located in the eccentrically offset part of the pressure chamber.

17 Claims, 3 Drawing Figures

AIR-COMPRESSING INJECTION INTERNAL COMBUSTION ENGINE WITH AUXILIARY CHAMBER

The present invention relates to an air-compressing injection internal combustion engine with a main combustion space arranged in the piston and with an auxiliary chamber in continuous communication with the main combustion space by way of a channel-shaped constriction or narrow place, which includes an injection nozzle and a glow plug.

The two-stage combustion systems known as prechamber or vortex chamber processes entail specific disadvantages. With the vortex chamber process the soot emission in the partial load range can be kept very low by the massive air swirl in the chamber and the intensive air-feed to the fuel conditioned thereby; however, at full load the air in the combustion space will be utilized only poorly—conditioned by the strongly eccentric arrangement of the vortex chamber, necessary by reason of the valves, and its firing channel, by the insufficient seizing of the main combustion space air resulting therefrom and finally by the long combustion paths—which means that the average pressure yield is limited by prematurely reaching the smoke limit.

With the prechamber process, the conditions are the reverse, namely, a poor smoke-producing combustion in the partial load range, but a good seizing of the main combustion space air by the concentric arrangement of the prechamber and the multi-aperture construction. As a result thereof, the average pressure becomes higher at which one can drive at the smoke limit.

The present invention is now concerned with the task to bring about a change of the auxiliary chamber and of the injection, according to which the disadvantages of the two aforementioned combustion systems, namely, of the vortex method and of the prechamber method, are eliminated and the mixture preparation, the ignition of the fuel-air mixture and the utilization of the air available for the combustion both at partial load as also at full load are assured optimally in each case.

The underlying problems are solved according to the present invention in that the pressure chamber of the auxiliary chamber is located eccentrically in relation to the injection nozzle and the constriction place which are disposed coaxially or approximately coaxially opposite one another, and the injection nozzle injects with a first jet into the constriction place and with a second jet in the direction toward or in the near area of the glow plug located in the eccentrically offset part of the pressure chamber.

It will be achieved by the auxiliary jet that especially during starting and under partial load operation, a sufficient amount of air-distributed fuel is present in the auxiliary chamber and thus the prerequisite of a good mixture formation exists, and that additionally always constant and therewith optimal ignition conditions prevail in the pressure chamber because approximately constant air ratio numbers exist—independent of the load. In contradistinction thereto, the main jet determines the load condition.

The air movement in the auxiliary chamber which necessarily results from the eccentric location of the pressure space assists the fuel preparation.

In order to enhance the distribution of the fuel, provision is made according to the present invention that an impact pin is so arranged in the path of the second jet that the jet impinges completely on the impact pin.

However, for an enhanced fuel distribution, the impact pin may also be arranged underneath the glow plug in such a manner that the second jet impinges directly on the impact pin.

In an advantageous construction of the present invention, the second jet may also impinge directly on the glow plug constructed as impact pin in order to save the costs of the manufacture and installation of the separate impact pin.

Accordingly, it is an object of the present invention to provide an air-compressing injection internal combustion engine with an auxiliary chamber which avoids the aforementioned shortcomings and drawbacks encountered in the prior art.

Another object of the present invention resides in an air-compressing injection-type internal combustion engine with an auxiliary chamber, in which the mixture preparation, the ignition of the fuel/air mixture and the utilization of the air available for the combustion are optimally assured at full-load as also at partial loads.

A further object of the present invention resides in an air-compressing injection internal combustion engine of the type described above, in which a sufficient amount of air-distributed fuel is present in the auxiliary chamber under all load conditions including the starting and partial load operations.

Still a further object of the present invention resides in an air-compressing injection internal combustion engine with an auxiliary chamber, in which optimal ignition conditions always remain in the pressure chamber thereof.

Another object of the present invention resides in an air-compressing injection internal combustion engine of the type described above which ensures an improved fuel preparation as well as fuel distribution in the auxiliary chamber.

Figure 2:
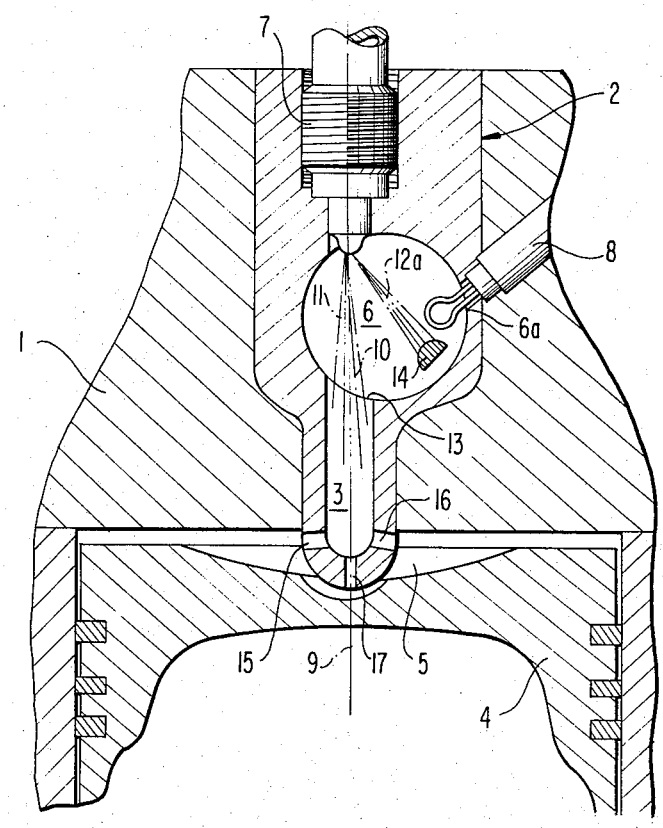
Figure 3:
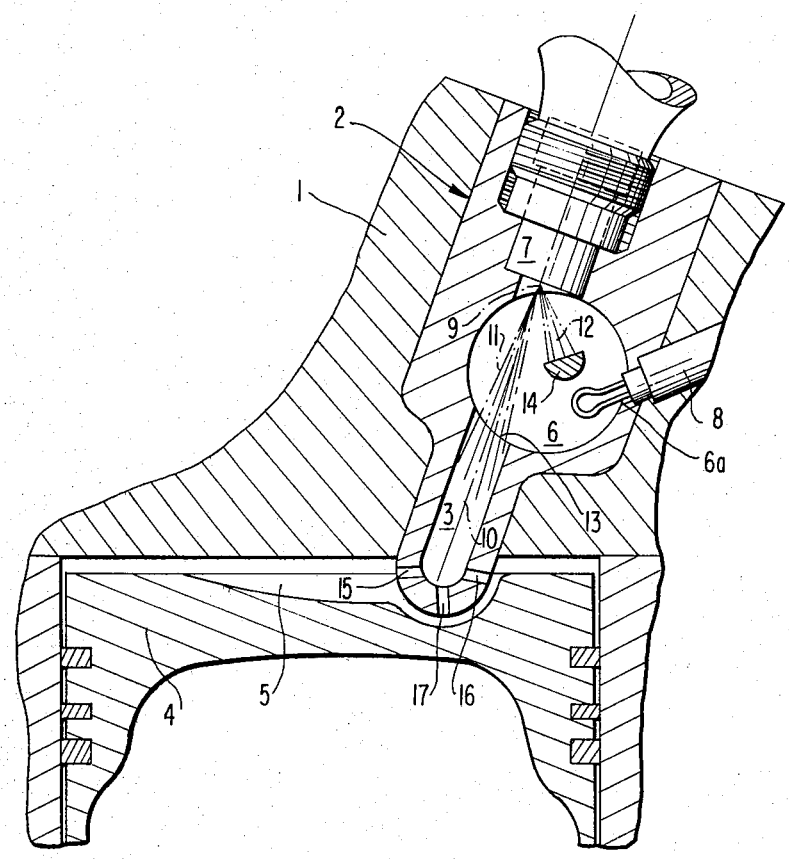

These and other objects, features and advantages of the present invention will become more apparent from the following description when taken in connection with the accompanying drawing which shows, for purposes of illustration only, several embodiments in accordance with the present invention and wherein:

FIG. 1 is a partial cross-sectional view through an injection type air-compressing internal combustion engine with an auxiliary chamber disposed substantially coaxially to the cylinder axis in accordance with the present invention;

FIG. 2 is a partial cross-sectional view, similar to FIG. 1, through an injection-type air-compressing internal combustion engine in which the impact pin is disposed underneath the glow plug in accordance with the present invention; and FIG. 3 is a partial cross-sectional view, similar to FIGS. 1 and 2, through a further modified embodiment of an injection-type air-compressing internal combustion engine in which the auxiliary chamber extends at an acute angle to the cylinder axis.

Referring now to the drawing wherein like reference numerals are used throughout the various views to designate like parts, an auxilairy chamber generally designated by reference numeral 2 is arranged in the cylinder head 1 of an air-compressing injection internal combustion engine according to FIGS. 1 to 3, which is in communication by way of a channel-shaped constriction or narrow place 3, i.e., by way of a so-called burner throat, with the main combustion space 5 disposed in the piston top 4.

The auxiliary chamber 2 is provided with a pressure chamber 6 in which terminate an injection nozzle 7 and a glow plug 8.

The injection nozzle 7 and the constricted place 3 are coaxially disposed opposite one another, whereby the pressure chamber 6 is arranged eccentrically to both the axis 9 of the injection nozzle 7 and to the axis 10 of the burner throat 3.

The injection nozzle 7 which is constructed as throttling pin nozzle or as apertured-nozzle injects two jets into the pressure chamber 6. The two nozzle apertures are provided with strongly different diameters. The first nozzle jet or main jet 11 is directed toward the constricted place 3 and the second nozzle jet or auxiliary jet 12 is directed according to FIGS. 1 and 3 toward the glow plug 8 which is placed in the eccentrically offset part of the pressure chamber 6 at the outermost end 6a thereof.

For purposes of better fuel distribution, an impact pin 14 may be arranged inside of the pressure chamber 6 in the path of the second nozzle jet 12 approximately at half the jet length (FIG. 1) which, however,—as can be seen from FIG. 2—may also be placed underneath the glow plug 8 within the nearby area thereof. The second jet 12a thereby impinges directly on the impact pin 14.

Possibly the glow plug 8 may itself be constructed as impact pin so that the costs of an impact pin separately arranged in the pressure chamber 6 is avoided.

The constricted place 3 of the auxiliary chamber 6 projects with its end into the trough-shaped main combustion space 5 and is provided at this place with several combustion channels branching off from the same, for example, with channels 15, 16 and 17. In FIGS. 1 to 3, the channels 15 and 16 extend approximately horizontally whereas the channel 17 extends vertically.

Depending on the size and arrangement of the valves (not shown) arranged suspended in the cylinder head, the auxiliary chamber 2 may be arranged vertically and terminating concentrically in the main combustion space 5 (FIG. 1) or may be arranged at a very acute angle to the cylinder axis, for example, at about 20°, with an eccentric discharge into the main combustion space 5 (FIG. 3) which is also applicable to the embodiment of FIG. 2.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An air-compressing injection internal combustion engine which comprises a main combustion space means arranged in a piston and an auxiliary chamber means in continuous communication with the main combustion space means by way of a channel-shaped constriction means, said auxiliary chamber means including a fuel injection nozzle means and glow plug means, characterized in that the auxiliary chamber means includes a pressure chamber which is disposed eccentrically in relation to the fuel injection nozzle means and the constriction means, the injection nozzle means is operable to inject a first jet of fuel into the constriction means and a second jet of fuel at least approximately into an area of the glow plug means located in the eccentrically offset part of the pressure chamber, and in that independent impact means cooperable with the second jet of fuel are mounted on a wall of the pressure chamber for enhancing a distribution of fuel injected by the fuel injection nozzle means.

2. An air-compressing injection internal combustion engine according to claim 1, characterized in that the injection nozzle means and the constriction means are disposed at least approximately coaxially opposite one another.

3. An air-compressing injection internal combustion engine according to claim 1, characterized in that the injection nozzle means and the constriction means are disposed substantially coaxially opposite one another.

4. An air-compressing injection internal combustion engine according to claim 1, characterized in that the injection nozzle means injects with a second jet in the direction of the glow plug means.

5. An air-compressing injection internal combustion engine according to claim 1, characterized in that the injection nozzle means injects with a second jet into the nearby area of the glow plug means.

6. An air-compressing injection internal combustion engine which comprises a main combustion space means arranged in a piston and an auxiliary chamber means in continuous communication with the main combustion space means by way of a channel-shaped constriction means, said auxiliary chamber means including a fuel injection nozzle means and a glow plug means, characterized in that the auxiliary chamber means includes a pressure chamber which is disposed eccentrically in relation to the fuel injection nozzle means and the constriction means, the injection nozzle means is operable to inject a first jet of fuel into the constriction means and a second jet of fuel at least approximately into an area of the glow plug means located in the eccentrically offset part of the pressure chamber, and in that an impact pin means is arranged in the pressure chamber in the path of the second jet in such a manner that the second jet impinges substantially completely on the impact pin means.

7. An air-compressing injection internal combustion engine according to claim 1, characterized in that the means for enhancing the distribution of fuel includes an impact pin means arranged in the pressure chamber underneath the glow plug means so that the second jet impinges directly on the impact pin means.

8. An air-compressing injection internal combustion engine according to claim 1, characterized in that the second jet impinges directly on the glow plug means, said glow plug means is constructed at the same time as the means for enhancing distribution of the fule.

9. An air-compressing injection internal combustion engine according to claim 8, characterized in that the injection nozzle means injects with a second jet in the direction of the glow plug means.

10. An air-compressing injection internal combustion engine according to claim 7, characterized in that the injection nozzle means injects with a second jet into the nearby area of the glow plug means.

11. An air-compressing injection internal combustion engine which comprises a main combustion space means arranged in a piston and an auxiliary chamber means in continuous communication with the main combustion space means by way of a channel-shaped constriction means, said auxiliary chamber means including a fuel injection nozzle means and glow plug means, characterized in that the auxiliary chamber means includes a pressure chamber which is disposed eccentrically in relation to the fuel injection nozzle means and the constriction means, the injection nozzle means is operable to inject a first jet of fuel into the constriction means and the second jet of fuel at least approximately into an area of the glow plug means located in the eccentrically offset part of the pressure chamber, and in that the auxiliary chamber and channel-shaped constriction means are arranged at an acute angle with respect to a central axis of the cylinder of the internal combustion engine so as to permit an eccentric discharge into the main combustion space means.

12. An air-compressing injection internal combustion engine according to claim 11, characterized in that the acute angle is about 20°.

13. An air-compressing injection internal combustion engine according to claim 11, characterized in that the injection nozzle means and the constriction means are disposed substantially coaxially opposite one another.

14. An air-compressing injection internal combustion engine according to claim 13, characterized in that the injection nozzle means injects with a second jet in the direction of the glow plug means.

15. An air-compressing injection internal combustion engine according to claim 14, with an impact pin means in the pressure chamber, characterized in that the impact pin means is arranged in the path of the second jet in such a manner that the jet impinges substantially completely on the impact pin means.

16. An air-compressing injection internal combustion engine according to claim 11, characterized in that the injection nozzle means injects with a second jet in the direction of the glow plug means.

17. An air-compressing injection internal combustion engine according to claim 11, with an impact pin means in the pressure chamber, characterized in that the impact pin means is arranged in the path of the second jet in such a manner that the jet impinges substantially completely on the impact pin means.

* * * * *